United States Patent [19]
Lee

[11] Patent Number: 5,907,905
[45] Date of Patent: Jun. 1, 1999

[54] METHOD FOR MANUFACTURING A HEMISPHERE OF A HEMISPHERIC BEARING

[75] Inventor: Chang-woo Lee, Kyonggi-do, Rep. of Korea

[73] Assignee: Samsung Electronics Co., Ltd., Kyungki-Do, Rep. of Korea

[21] Appl. No.: 08/984,532

[22] Filed: Dec. 3, 1997

[30] Foreign Application Priority Data

Dec. 3, 1996 [KR] Rep. of Korea ..................... 96-61353

[51] Int. Cl.⁶ ........................................... B23P 15/00
[52] U.S. Cl. ................................. 29/898.042; 72/355.4; 72/463; 29/412
[58] Field of Search ................... 29/898.042, 898.041, 29/898.02, 598, 412; 72/355.4, 360, 463

[56] References Cited

U.S. PATENT DOCUMENTS 2,067,568  1/1937  Grünthal ............................. 72/360
2,841,865  7/1958  Jackson .............................. 72/360
4,571,799  2/1986  Chitayat .......................... 29/149.5 A

FOREIGN PATENT DOCUMENTS 0594724  9/1925  France .............................. 72/360

*Primary Examiner*—S. Thomas Hughes
*Assistant Examiner*—Marc W. Butler
*Attorney, Agent, or Firm*—Sughrue, Mion, Zinn, Macpeak & Seas, PLLC

[57] ABSTRACT

Disclosed is a method for manufacturing a hemisphere used in a hemispheric bearing apparatus capable of performing the mass production and enhancing the mechanical characteristic of the hemisphere by manufacturing a sphere using a pair of forging frames formed in the shape of hemisphere, grinding the spherical surface, and then dividing the sphere into two, thereby reducing the time and process for manufacturing the hemisphere and increasing the productivity of the hemisphere.

2 Claims, 3 Drawing Sheets

METHOD FOR MANUFACTURING A HEMISPHERE OF A HEMISPHERIC BEARING

BACKGROUND OF THE INVENTION

1. Field of the Invention

The present invention relates to a method for manufacturing a hemisphere used in a hemispheric bearing apparatus. More particularly, the invention is directed to a method for manufacturing, capable for use in mass production and for enhancing the mechanical characteristic of a hemisphere, by manufacturing a sphere using a pair of forging frames, each formed in the shape of a hemisphere, grinding the spherical surface, and then dividing the sphere into two, thereby forming two hemispheres.

2. Description of the Related Art

Recently, with the improvement of technologies in the information and media industries, systems such as computer systems, audio systems, and video systems, are becoming more miniaturized. In this respect, there has been a trend to require components of such systems to have more precise performance. Driving apparatuses require a bearing which is precise, stable, and has a superhigh rotation performance. A hemispheric bearing, i.e., a dynamic pressure fluid bearing apparatus which supports both a radial load and a thrust load and is suitable to perform the superhigh speed rotation, has been actively developed.

FIG. 1 is a block diagram illustrating the processing order for manufacturing a hemispheric bearing using a NC (numerical control) machine tool and a CNC (computerized numerical control) machine tool.

First, the curvature and radius of the hemisphere, the position of a through hole, etc., are designed on paper (step 10). After performing a preliminary step for selecting a working position and tool, an instruction tape having the information about the hemisphere is made based on the designed drawing (step 20).

The information of the instruction tape is inputted to an information processing circuit which is a computerized numerical control apparatus of the CNC machine tool (step 30). By operating a servomechanism which controls the power and the position of the tool of the CNC machine, a test cutting of a material to be processed is performed (step 40). After that, in the case that the size of the hemisphere is within the allowable error as a result of a re-measurement, a hemisphere is manufactured by a machine tool (step 50).

When the hemisphere is completely manufactured (step 60), a through hole is formed so that the hemisphere 60 can be indented at a fixing axis 20, and the grinding and lapping process are performed (step 70) so that the sphericity of the hemisphere 60 can be within the allowable value. To control the clearance between the hemisphere and a bush by a spacer 40a, the upper end of the hemispheric surface of the hemisphere is cut in a predetermined length (step 80). After cutting, a dynamic pressure generating groove having a predetermined area is formed on the surface of the hemisphere, and then a surface treatment of the hemisphere is performed (step 90).

However, in the above mentioned case that the hemisphere of the hemispheric bearing is manufactured by a machine tool, first the hemisphere is manufactured by the machine tool and the through hole is formed so that the hemisphere can be indented in the fixing axis. After those steps, the methods for processing the hemispheric surface through grinding or lapping are adopted, and thereby manufacturing the hemispheric surface having the sphericity above 0.05 μm is difficult due to time constraints. In other words, the conventional method of manufacturing requires too much time to process the hemispheres with precision, thereby it is difficult to achieve mass production.

SUMMARY OF THE INVENTION

Therefore, it is an object of the present invention to provide a method for manufacturing a hemisphere which is capable of performing mass, production and enhancing the mechanical characteristic of the hemisphere, by manufacturing a sphere using a pair of forging frames each formed in the shape of hemisphere, grinding the spherical surface, and then dividing the sphere into two.

According to one aspect of the present invention, a method for manufacturing a hemisphere of a hemispheric bearing includes the steps of: facing a first frame and second frame each having a hemispheric recess at their inner surface and inserting a material having a predetermined volume between the two frames; forging the material into a sphere by pressing the first and second frames together; and cutting the sphere into two having the same diameter.

Selectively, after the cutting step, a step of forming a through hole is further included. Moreover, after the step of forming a through hole, a step of grinding and lapping the hemisphere is further included.

Preferably, the volume of the space between the first and second forging frames whose recesses face together is smaller than the volume of the material inserted within. Moreover, the forging step is performed at normal temperatures.

According to another aspect of the present invention, a method for manufacturing a hemisphere of a hemispheric bearing includes the steps of: inserting a material so that the center of a material can be penetrated by a fixed rod having the same diameter as a fixing shaft to which a hemisphere is fixed; inserting first and second frames movable to the rod so that each recess formed at the inner surface of the first and second frames can face each other; forging the material into a sphere by pressing the first and second frames together; and cutting the sphere into two having the same diameter.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1:
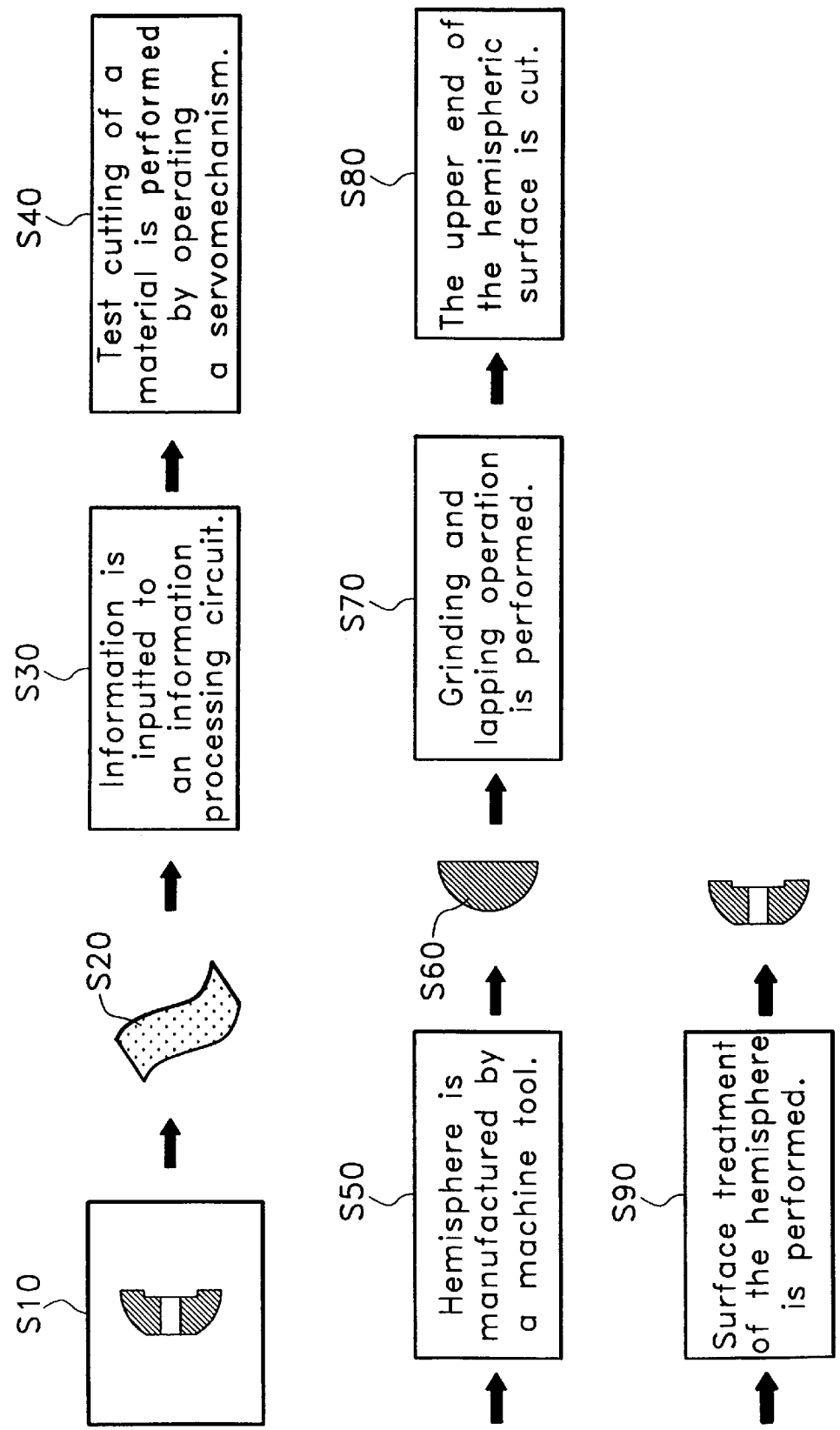
FIG. 1 is a process drawing illustrating a conventional method for manufacturing a hemisphere.
Figure 2:
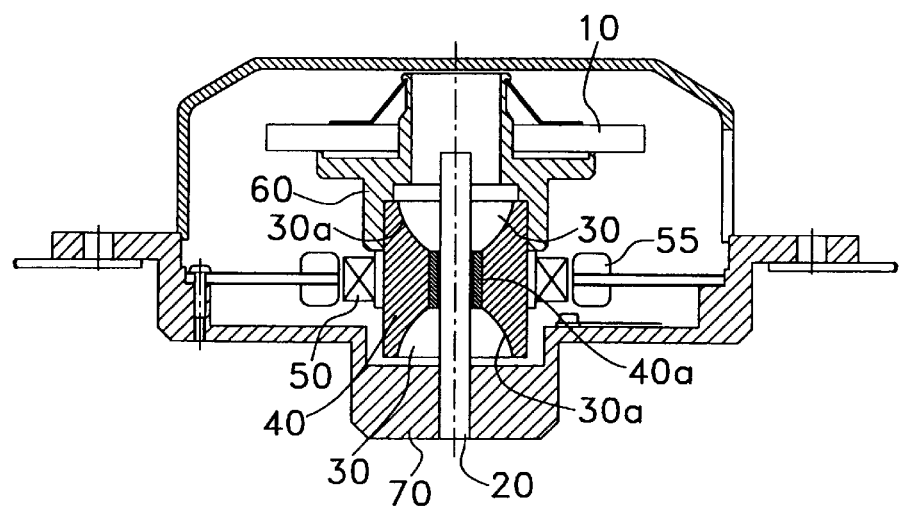
FIG. 2 is a sectional view illustrating an optical polygon driving apparatus of a laser printer employing a hemispheric bearing.

FIG. 2 illustrates an optical polygon driving apparatus of a laser printer employing a hemispheric bearing.

The optical polygon driving apparatus of the laser printer employing the hemispheric bearing includes: a fixing shaft 20 which is fixed along the rotating center of an optical polygon 10; a hemisphere 30 having a hemispheric surface which is indented in the fixing shaft 20 and has a high sphericity; a bush 40 for supporting a radial load and a thrust load; a rotor 50 and a stator core 55 which are the driving apparatuses partly illustrated; an upper housing 60; and a lower housing 70.

The hemisphere 30 is formed by dividing the sphere having a high sphericity into two parts each having the same radius. After cutting a part of the upper end of the hemispheric surface of each hemisphere 30, a dynamic pressure generating groove is formed at the hemispheric surface. In the center of the hemisphere 30, a through hole is formed so that the hemisphere 30 can be coupled to a predetermined place of the outer surface of the fixing shaft 20.

The bush 40 as a cylindrical bar shape. Moreover, the bush 40 has a through hole having a diameter larger than that of the fixing shaft 20 at the center and the inside is filled and has a predetermined diameter. After that, a hemispheric groove 30a is formed so that the cut surfaces of the hemisphere can be placed on the same plane as the surfaces of both ends of the bar, when the hemispheric surfaces of the hemisphere 30 which are previously formed at both ends of the bar face each other. Here, the hemispheric groove 30a is processed to have a curvature so as to form a uniform gap between the hemispheric groove 30a and the hemisphere 30 when it is connected to the hemisphere 30.

Moreover, a doughnut-shaped rotor 50 envelopes the outer surface of the bush 40. A stator core 55 is attached to the lower housing 70 apart from the rotor 50 by a predetermined distance. At the surface of the through hole where the hemispheric groove 30a is not formed, a spacer 40a is fitted for controlling the clearance between the bush 40 and the hemisphere 30.

The fixing shaft 20 on which the hemisphere 30 is coupled is indented and fixed at the lower housing 70. Moreover, the bush 40 where the rotor 50 and the stator core 55 are fixed rotatably to the fixed fixing shaft 20 is attached to the bottom of the upper housing 60 where the optical polygon is fixed. As a result, the hemisphere 30 and the fixing shaft 20 are fixed, and the upper housing 60 where the bush 40 and the optical polygon 10 are fixed is established so as to be rotated on the fixing shaft 20.

Figure 3:
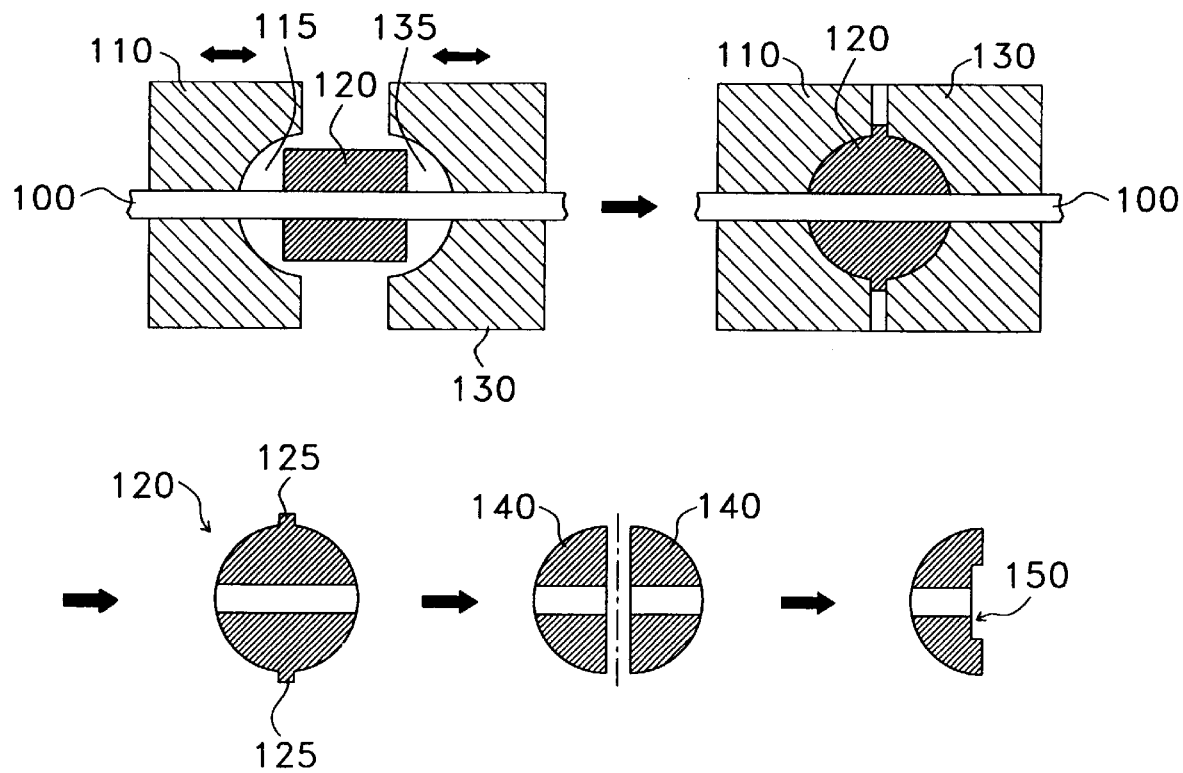
FIG. 3 is a process drawing illustrating a method for manufacturing a hemisphere according to one embodiment of the present invention.

FIG. 3 is a process drawing illustrating the method for manufacturing the hemisphere of the hemispheric bearing according to the present invention. As shown in the drawing, a rod 100 is formed, which has a diameter slightly smaller than the fixing shaft 20 to consider space for processing and is fixed at a forging machine. A first forging frame 110 having a hemispheric recess 115 at its inner side is inserted through one end of the rod 100. Through the other end of the rod 100, a cylindrical material 120 is inserted. After that, a second forging frame 130 having a recess 135 at its inner side is inserted through the other end of the rod 100. At this time, the shaft axis of the first and second forging frames 110 and 130 should be aligned centering on the rod 100.

After that, the first and second forging frames 110 and 130 are fixed to a ram (not illustrated) and an anvil (not illustrated) for pressure. At this time, the material 120 is deformable plastic, inside of the first and second forging frames 110 and 130 to have a volume calculated in consideration of the processing space without a porosity.

Once the material 120 and the forging frames are prepared, the forming process is performed. By pressing the ram and anvil, the material 120 is cold-forged at normal temperature (25–75° F.) to a rapid deformation.

After cold-forging, the material 120 which is formed into a spherical shape by the first and second forging frames 110 and 130 is extracted and fins 125 attached to the material 120 are removed. Then, by dividing the spherical material 120 into two symmetrical halves, a pair of hemispheres 140 are manufactured.

To enhance the sphericity of the extracted sphere, the spherical grinding and lapping is repeatedly performed before the sphere is divided.

When the hemisphere 140 is formed, the upper part of the hemispheric surface is cut having a predetermined length so that the clearance between the hemisphere 140 and the bush can be maintained by the spacer 40a. Moreover, with a milling machine, a ring-shaped groove 150 is formed at the cut surface of the hemisphere 140 so as to prevent the hemisphere from being moved from the fixing shaft.

After the shape of the hemisphere is formed through the above-described process, the surface treatment of the hemisphere is performed. First, the dynamic pressure generating groove is formed as deep as 2–5 $\mu$m by a wet etching or plasma etching.

After that, on the hemispheric surface having the dynamic pressure generating groove, at least one coating operation is performed. Here, the coating member produced by the coating process is TiN or DLC (diamond-like-carbon).

By manufacturing the hemisphere as aforesaid, the processing is easy and the manufacturing time is reduced. Moreover, by manufacturing the hemisphere with the forging frame, the hemispheres each have a precise sphericity and can uniformly be manufactured.

Figure 4:
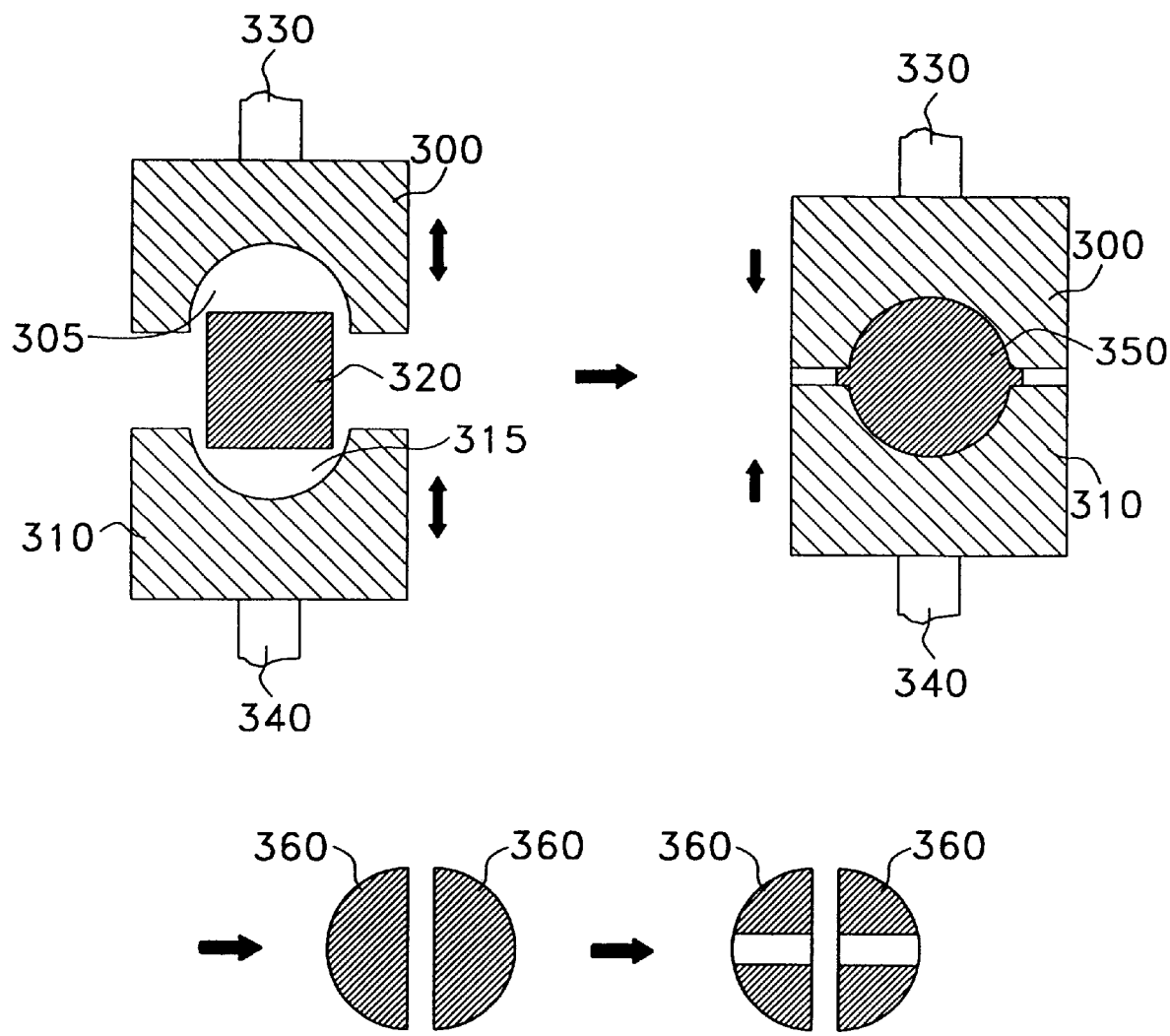
FIG. 4 is a process drawing illustrating a method for manufacturing a hemisphere according to another embodiment of the present invention.

FIG. 4 is a process drawing illustrating another embodiment according to the present invention. As shown in the drawing, the inside of the first and second forging frames 300 and 310, have recesses 305 and 315 each having the same shape as the hemisphere of the hemispheric bearing. A material 320 having a square cross-section, is positioned between the recesses 305 and 315. After that, the first and second forging frames 300 and 310 are pressed by a ram 330 and an anvil 340, and thereby a sphere 350 is formed. After that, the spherical surface is repeatedly grinded and lapped, and then the sphere 350 is divided, thereby obtaining a pair of hemispheres 360.

After forming a through hole having a predetermined diameter through the hemisphere 360, the surface treatment of the hemisphere is performed. Forming the through hole after manufacturing the hemisphere is specially effective when the hemisphere having the same size is applied to fixing shafts having different diameters.

As described above, the hemisphere which was previously processed by the NC machine tool or the CNC machine tool is now manufactured after forming a sphere by means of the forging process by the forging frames and grinding the sphere and then dividing the sphere into two parts. As a result, since the sphere, instead of a pair of hemispheres, is grinded, the time and process for manufacturing the hemisphere can be reduced, thereby increasing the productivity of the hemisphere.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for manufacturing a hemisphere of a hemispheric bearing, comprising the steps of:

fixing a rod to a forging machine, having a diameter slightly smaller than a fixing shaft of the hemispheric bearing;

inserting a first frame movably to said rod;

inserting a material over said rod so that said rod penetrates the center of said material;

inserting a second frame movably to said rod, each of said first and second frames having a hemispheric recess, wherein said first and second frames face each other and said material is held therein;

forging the material into a sphere by pressing said first and second frames together;

extracting said sphere from said first and second frames; and cutting the sphere into two hemispheres having the same diameter, after grinding and lapping the spherical surface of said sphere.

2. A method of claim 1, further comprising a step of fixing said first and second forging frames to a ram and an anvil for pressing said first and second frames together in said forging step.

* * * * *